United States Patent

[11] 3,587,612

| [72] | Inventors | John W. Creed, Jr.; |
| | | Edgar C. Paffrath, Saginaw, Mich. |
| [21] | Appl. No. | 821,661 |
| [22] | Filed | May 5, 1969 |
| [45] | Patented | June 28, 1971 |
| [73] | Assignee | General Motors Corporation |
| | | Detroit, Mich. |

[54] FLUIDIC CONTROL WITH A RESET CONTROL
6 Claims, 1 Drawing Fig.

[52] U.S. Cl. .................................................... 137/81.5
[51] Int. Cl. .................................................... F15c 1/12, F15c 3/00
[50] Field of Search............................................ 137/81.5

[56] References Cited
UNITED STATES PATENTS

| 3,292,648 | 12/1966 | Colston | 137/81.5X |
| 3,395,719 | 8/1968 | Boothe et al | 137/81.5X |
| 3,443,575 | 5/1969 | Hughes | 137/81.5 |
| 3,481,351 | 12/1969 | Reilly et al | 137/81.5 |
| 3,486,518 | 12/1969 | Howland | 137/81.5 |
| 3,494,357 | 2/1970 | Kimball | 137/81.5X |

Primary Examiner—Samuel Scott
Attorneys—W. E. Finken, A. M. Heiter and D. F. Scherer ABSTRACT: A fluidic control system having a bistable amplifier to control a switching device and a monostable amplifier and a pulse generator to control switching of the bistable amplifier. A second monostable amplifier is provided, as a zero reset, to insure the power input to the bistable amplifier is directed to the same output during each initial energization of the control system to condition the switching device for the preferred startup mode of operation.

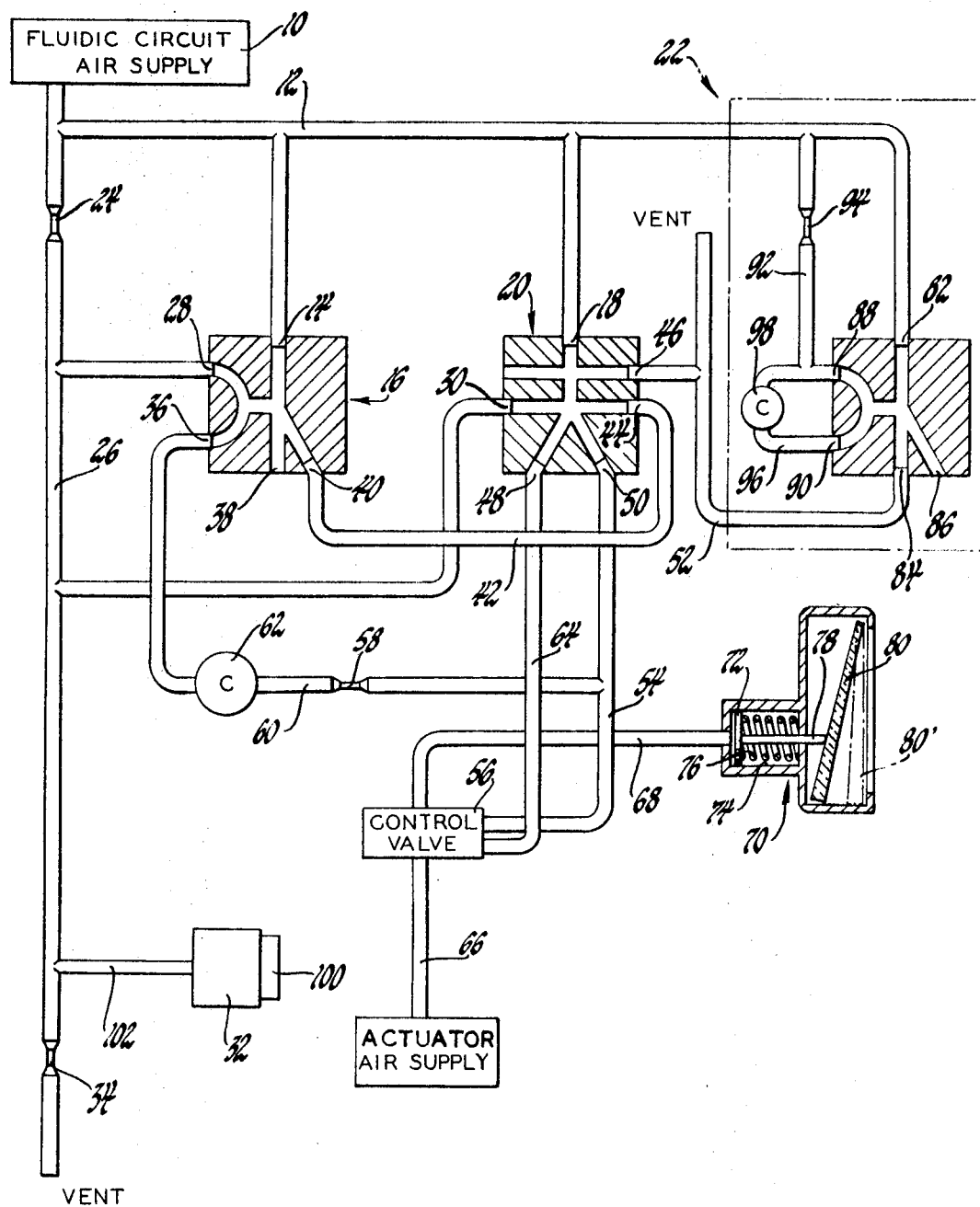

FLUIDIC CONTROL WITH A RESET CONTROL

This invention relates to fluidic control systems and more particularly to control systems wherein a predetermined starting mode of operation is desired.

Many devices such as safety clamps on machine tools, parking brakes for automobiles, automatic transmissions and day-night mirrors have a preferred or desired position during initial start up of the device or the article associated with the device. For example, the parking brake is preferably disengaged when the operator starts the vehicle or the day-night mirror is preferably in the day viewing position when the operator initially starts the vehicle.

The present invention provides a control that will place the device to be controlled in a preferred startup mode automatically and also permits the operator to move the device between this mode and another operating mode.

The invention includes a bistable fluidic device, two monostable fluidic devices and a pulse generator. The bistable fluidic device has two output ports operatively connected to the component to be controlled. A signal from the first output port places the component in one mode while a signal from the second output port places the component in another mode. The pulse generator delivers a control signal to a control input port of the bistable device and to a control input port of one of the monostable devices which has another control port connected with the second bistable output. This monostable device is an "and" type amplifier, that is, a control signal must be present at both control ports before the power input is switched from the biased output to the controlled output. The biased output is vented and the control output is connected to a control input port of the bistable device opposing the control input connected to the pulse generator. The other monostable device is an "end" type also. One control input of this device is connected, through a restrictor, to the power input which is connected to the power input of the other fluidic devices and the other control input is connected, through a capacitor, to the power input. The capacitor provides a time delay between pressurization of the power input and the second control input. Therefore, when the power input is initially pressurized, the output is from the biased output. However, when control pressure develops in the second control input, the input will be switched to the controlled output where it will remain until the power input is unpressurized. The biased output is connected to a control port on the bistable device adapted to direct the power input to the first power output. Thus, whenever the power input is initially pressurized, the first power output of the bistable is energized. After the power input has been pressurized, operation of the pulse generator by the operator will cause the bistable device to switch from the first output to the second output. After a time delay if the operator again actuates the pulse generator, the bistable device will switch back to the first output.

It is therefore an object of this invention to provide in a fluidic control a reset device which will condition the fluid control to assume a preferred startup mode.

Another object of this invention is to provide in a fluidic control an operator controlled pulse generator which will control the output switching of a bistable fluidic device and a monostable fluidic device which will establish a preferred output for the bistable device during initial pressurization of the fluidic control.

These and other objects and advantages will be apparent from the following description and drawing of a schematic diagram of the fluidic control.

Referring to the drawing, there is seen a fluidic control circuit having an air supply 10 which delivers fluid via passage 12 to a power input port 14 of an "and" monostable fluidic device 16, a power input port 18 of a bistable fluidic device 20 and to a reset monostable fluidic device generally designated 22. The passage 12 also delivers fluid through a restrictor 24 to a passage 26 which is connected to a control port 28 of the monostable device 16 and to a control port 30 of the bistable device 20. The passage 26 is also connected to a pulse generator 32 and through a restrictor 34 to a vent which is an atmospheric connection for the circuit. The monostable device 16 also has a second control input port 36, a biased power output port 38 and a controlled power output port 40. The power output 40 is connected via passage 42 to a control input port 44 of the bistable device 20. The monostable device 16 is an "and" fluidic aMplifier, that is, it requires a control input at both control ports 28 and 36 to switch the power input from the biased output port 38 to the controlled output port 40.

The bistable fluidic device 20 has three control input ports 30, 44 and 46 and two power output ports 48 and 50. The control port 46 is connected to a passage 52 which receives fluid from the reset monostable device 22. The output port 50 is connected via passage 54 to a fluid control valve 56 and through a restrictor 58 to a passage 60 which contains a capacitor 62 and is connected to the control port 36 of the monostable device 16. The power output port 48 is connected via passage 64 to the control valve 56. Due to the stability characteristic of a bistable fluid amplifier, once the output flow has been switched from one output port, i.e., port 48 to the other output port, i.e., port 50, by a control signal at a control port, i.e., port 30, the output flow will continue from that output port, i.e., port 50, even though the control signal is removed, until a control signal is presented at another control port, i.e., port 44.

The control valve 56 receives fluid under pressure from an actuator supply via passage 66 and delivers fluid via passage 68 to an actuator 70. The control valve 56 is a conventional fluid valve and is controlled by the passages 54 and 64 such that when passage 54 is pressurized, the valve 56 is opened to permit fluid flow from passage 66 to passage 68 and when passage 54 is pressurized, the valve 56 is closed to block fluid flow between passages 66 and 68.

The actuator 70 has a piston 72 slidably disposed in a bore 74 and urged to the left by a spring 76. The piston 72 is moved to the right when pressure is available in passage 68 and is moved to the left by the spring 76 whenever there is no pressure in passage 68. The piston 72 has a stem 78 which controls the movement of a component 80 which may be the reflecting surface of a day-night type mirror. With the piston 72 in the position shown, the mirror 80 is in the day position, and when passage 68 is pressurized and the piston 72 is moved to the right, the mirror 80 will be moved to the dashed or alternate position 80 which is the night position.

The reset monostable device 22 has a power inlet port 82 which receives fluid from passage 12, a biased outlet port 84 which is connected to passage 52, a controlled outlet port 86 which is vented to atmosphere and a pair of control input ports 88 and 90. The reset monostable device 22 is an "and" type amplifier so that control signals must be present at both control input ports 88 and 90 to switch the power flow from the biased output port 84 to the controlled output port 86. Also, both control signals must remain if it is desired to maintain the power flow from the controlled output port 86. The control inlet port 88 is connected via passage 92 to a restrictor 94 to the passage 12. The control input port 90 is connected via passage 96 through a capacitor 98 to the passage 92. The capacitor 98 provides a time delay between pressure buildup in passage 92 and pressure buildup in passage 96. Thus upon initial pressurization of passage 12, the fluid at the power input 82, will be directed to the power output 84 and passage 52. The control port 88 will also be pressurized when the input port 82 is pressurized; however, the control port 90 will not be pressurized for a predetermined amount of time depending upon the volume of the capacitor 98. When the control port 90 is pressurized, the power input will be switched from biased output port 84 to the controlled output port 86. Thus, it is seen that whenever the passage 12 is initially pressurized, the biased output port 84 will be pressurized for a short duration until the power output is switched to the control output 86. As long as the passage 12 remains pressurized, the two control ports 88 and 90 will remain pressurized thus directing the output of the monostable device 22 to the control port 86. When the biased output port 84 and passage 52 are pressurized, a control signal is delivered to the control port 46 of the bistable device 20. With a control input at port 46, a power flow will be directed from the power input port 18 to the power output port 48 thereby pressurizing passage 64 which closes the air valve 56. Thus, it is seen on initial pressurization of passage 12, the air valve 56 will be moved to the closed position irrespective of its previous condition of operation.

The pulse generator 32 is a small piston and cylinder arrangement having a button 100 such that when the button 100 is pushed, a volume of fluid will be forced through passage 102 into passage 26. The restrictor 24 and 34 in passage 26 are designed such that under normal conditions, the pressure drop from passage 12 to passage 26 through restrictor 24 is sufficiently large so that with the small volume of fluid flow there will be very little pressure in passage 26 and thus very small pressure at the control ports 28 and 30. However, when the button 100 is pushed, the additional fluid which is forced into passage 26 creates a pressure rise in the passage such that a control signal is present at the control port 28 and 30.

As described above, when the system is initially pressurized through passage 12, the passage 64 is pressurized thus placing the valve 56 in the closed position. To cause the valve 56 to open, the operator merely pushes the button 100 causing a control signal to be generated in passage 26 and at ports 28 and 30. Since the fluidic device 16 is an "and" device, a pressure signal at control port 28 alone will not cause a switch in the output from port 38 to port 40. The fluidic device 20, being a bistable device, will switch from output 48 to 50 when a control signal is present at control port 30. Thus, the passage 54 will be pressurized to place the valve 56 in the open position. The pressure in passage 54 will pass through the restrictor 58 and the capacitor 62 to the control port 36 of the fluidic device 16. However, there is a time delay between the pressurization of passage 54 and the control signal between the control port 36. This time delay permits the pressure signal generated by the pulse generator 32 to diminish such that when the control signal is available at port 36, the control signal at port 28 will no longer be available. Therefore, the air valve 56 will be opened and the actuator 70 will be moved to the right to adjust the mirror to the night position. To permit the mirror to return to the day position without shuting down the air system, the operator merely pushes the button 100 of the pulse generator 32 thereby generating another control signal in the passage 26. This input control is directed to port 28 which allows the control pressure available at port 36 to direct the power flow from input port 14 to output port 40 and via passage 42 through the control port 44 of the bistable device 20. The control signal at port 44 will be greater than the pulse signal at port 30 thereby causing the power output of bistable device 20 to be switched from control port 50 to control port 48. This will cause pressurization of passage 64 which will close the air valve 56 thereby permitting spring return of the actuator 70 so that the mirror 80 will be in the day position.

Since the fluidic air supply is generally a low pressure, two air supplies are used with this system. The pressure in the fluidic air supply is maintained at a low level sufficient to actuate the control valve 10 and the actuator air supply is maintained at a higher pressure to control the actuator 70. Since the fluidic controls are constant leak devices, the power consumption of the system is held to a minimum by controlling the pressure at a low level. If the actuator 70 could be controlled at the low pressure setting, the control valve 56 and the actuator air supply could be eliminated and the passages 54 and 64 could be connected directly to the actuator with the spring 76 being removed so that when passage 54 is pressurized, the piston 72 would be held in the position shown and when the passage 64 is pressurized, the piston 72 would be moved to the right.

The foregoing description and drawing are not intended as limitations as obvious modifications will be apparent to those skilled in the art.

We claim:

1. A fluidic control system for use with a positional device having a preferred starting position comprising fluid supply means; bistable fluidic means having an input port operatively connected with said fluidic supply means, and first and second output ports in fluid communication with said input port and operatively connected with the positional device; pulse generator means operatively connected to said bistable fluidic means and being operable to generate a pulse control signal to cause a change in fluid flow from the first to the second output port when only the pulse control signal is present; monostable fluidic means operatively connected to said fluid supply means, said bistable fluidic means and said pulse generator means to cause a change in fluid flow from said second output to said first output whenever fluid flow is from the second output and the pulse control signal is generated; and reset monostable fluidic means operatively connected with said fluid supply means and said bistable fluidic means to direct fluid flow from said input port to said first output whenever said fluid supply means is initially operated.

2. A fluidic control system for use with a positional device movable between a preferred starting position and another position comprising fluid supply means; bistable fluidic means having a bistable input port operatively connected with said fluidic supply means, first and second bistable output ports in selective fluid communication with said bistable input port and operatively connected with the positional device to move the positional device between said preferred starting position and said other position, and three bistable control port means for controlling fluid communication between said bistable input and bistable output ports; pulse generator means operatively connected to a first of said bistable control port means and being operable to generate a pulse control signal to cause a change in fluid flow from the first to the second bistable output port to move said positional device to said another position when only the pulse control signal is present; monostable fluidic means having an input port operatively connected to said fluid supply means, a controlled output port operatively connected to a second of said bistable control port means, a biased output port vented to atmosphere, a control port operatively connected with said second bistable output port, and a pulse control port operatively connected with said pulse generator means, said monostable fluidic means being operable to cause a change in fluid flow from the second to the first bistable output whenever fluid flow is from the second output and the pulse control signal is generated to move said positional device to said preferred starting position from said other position; and reset monostable fluidic means operatively connected with said fluid supply means and a third of said control port means to cause fluid flow to be directed from said bistable input port to said first bistable output whenever said fluid supply means is initially operated to insure said positional device will be in said preferred starting position.

3. A fluidic control system for use with a positional device having a preferred starting position comprising fluid supply means; bistable fluidic means having an input port operatively connected with said fluidic supply means, and first and second output ports in fluid communication with said input port and operatively connected with the positional device; pulse generator means operatively connected to said bistable fluidic means and being operable to generate a pulse control signal to cause a change in fluid flow from the first to the second output port when only the pulse control signal is present; monostable fluid means operatively connected to said fluid supply means, said bistable fluidic means and said pulse generator means to cause a change in fluid flow from said second output to said first output whenever fluid flow is from said second output and the pulse control signal is generated; and reset monostable fluidic means having a reset input port operatively connected with said fluid supply means, a biased output port operatively connected with said bistable fluidic means to direct fluid flow from said input port to said first output whenever said fluid supply means is initially operated to place said positional device in said preferred starting position, a controlled output port, a first control port, restrictor means between said first control port and said fluid supply, a second control port, and timing means between said first control port and said second control port for providing a time delay in fluid communication between said fluid supply means and said second control port when said fluid supply means initially operated to permit fluid communication between said reset input port and said biased output port until the time delay is accomplished after which fluid flow is switched from said biased output port to said controlled output port.

4. A fluidic control system for use with a positional device movable between a preferred starting position and another position comprising fluid supply means; bistable fluidic means having a bistable input port operatively connected with said fluidic supply means, first and second bistable output ports in selective fluid communication with said bistable output ports in selective fluid communication with said bistable input port and operatively connected with the positional device to move the positional device between said preferred starting position and said other position, and three bistable control port means for controlling fluid communication between said bistable input and bistable output ports; pulse generator means operatively connected to a first of said bistable control port means and being operable to generate a pulse control signal to cause a change in fluid flow from the first to the second bistable output port to move said positional device to said another position when only the pulse control signal is present; monostable fluidic means having an input port operatively connected to said fluid supply means, a controlled output port operatively connected and providing a control signal for a second of said bistable control port means, a biased output port vented to atmosphere, an input control port operatively connected with said pulse generator means, said monostable fluidic means being operable to cause a change in fluid flow from the second to the first bistable output whenever fluid flow is from the second output and the pulse control signal is generated to move said positional device to said preferred starting position from said other position; time delay means between said second bistable output port and said input control port for delaying fluid communication between said last-mentioned ports when fluid flow is switched from said first bistable output port to said second bistable output port to permit the pulse control signal to diminish, said pulse generator means and said monostable fluidic means being operable together to cause the fluid flow to be switched from the second bistable output port to the first bistable output port; and reset monostable fluidic means operatively connected with said fluid supply means and a third of said control port means to cause fluid flow to be directed from said bistable input port to said first bistable output whenever said fluid supply means is initially operated to insure said positional device will be in said preferred starting position.

5. A fluidic control system for use with a positional device movable between a preferred starting position and another position comprising fluid supply means; bistable fluidic means having a bistable input port operatively connected with said fluidic supply means, first and second bistable output ports in selective fluid communication with said bistable input port and operatively connected with the positional device to move the positional device between said preferred starting position and said other position, and three bistable control port means for controlling fluid communication between said bistable input and bistable output ports; pulse generator means operatively connected to a first of said bistable control port means and being operable to generate a pulse control signal to cause a change in fluid flow from the first bistable output port to the second bistable output port to move said positional device to said other position when only the pulse control signal is present; monostable fluidic means having an input port operatively connected to said fluid supply means, a controlled output port operatively connected to a second of said bistable control port means, a biased output port vented to atmosphere, a control port operatively connected with said second bistable output port, and a pulse control port operatively connected with said pulse generator means, said monostable fluidic means being operable to cause a change in fluid flow from the second to the first bistable output whenever fluid flow is from the second output and the pulse control signal is generated to move said positional device to said preferred starting position from said other position; and reset monostable fluidic means having a reset input port operatively connected with said fluid supply means, biased output port means operatively connected with and providing a reset control signal to a third of said bistable control port means to direct fluid flow from said bistable input port to said first bistable output whenever said fluid supply means is initially operated to place said positional device in said preferred starting position, a controlled output port, a first control port, restrictor means between said first control port and said fluid supply, a second control port, and timing means between said first control port and said second control port for providing a time delay in fluid communication between said fluid supply means and said second control port when said fluid supply means initially operated to permit fluid communication between said reset input port and said biased output port until the time delay is accomplished after which fluid flow is switched from said biased output port to said controlled output port.

6. A fluidic control system comprising fluid supply means; bistable fluidic means having an input port operatively connected with said fluidic supply means, and first and second output port means in selective fluid communication with said input port and operative to provide fluid flow to a device to be controlled; fluidic control signal means in fluid communication with said bistable fluidic means and being selectively operable to generate control signals to cause a change in fluid flow from said first output port means to said second output port means and vice versa; and reset monostable fluidic means having a reset input port in fluid communication with said fluid supply means, a biased output port in fluid communication with said bistable fluidic means to direct fluid flow from said input port to said first output whenever said fluid supply means is initially operated to place said positional device in said preferred starting position, a controlled output port, a first control port, restrictor means between said first control port and said fluid supply, a second control port, and timing means between said first control port and said second control port for providing a time delay in fluid communication between said fluid supply means and said second control port when said fluid supply means initially operated to permit fluid communication between said reset input port and said biased output port until the time delay is accomplished after which fluid flow is switched from said biased output port to said controlled output port.